United States Patent [19]

Hammond et al.

[11] Patent Number: 4,756,688
[45] Date of Patent: Jul. 12, 1988

[54] APPARATUS AND METHOD FOR THE FLOW CONTROL OF FLUE GAS TO COMBUSTION AIR IN A REGENERATIVE HEATING SYSTEM

[75] Inventors: Paul S. Hammond, Castle Bromwich; Geoffrey J. Parkinson, Sutton Coldfield; David A. Churchill, Solihull, all of England

[73] Assignee: British Gas plc, London, England

[21] Appl. No.: 32,570

[22] Filed: Apr. 1, 1987

[30] Foreign Application Priority Data

Apr. 14, 1986 [GB] United Kingdom ............... 8609070

[51] Int. Cl.⁴ ............................................. F27D 17/00
[52] U.S. Cl. ................................. 432/180; 431/11; 165/4
[58] Field of Search ............... 431/12, 20, 19, 11; 236/15 BD, 11; 126/112; 432/180, 179, 181, 182; 165/4, 9.2

[56] References Cited

U.S. PATENT DOCUMENTS 4,547,144 10/1985 Dietiker et al. .................. 431/12

Primary Examiner—Henry Bennett
Attorney, Agent, or Firm—Oblon, Fisher, Spivak, McClelland & Maier

[57] ABSTRACT

Apparatus is provided for the flow control of the flue gas to combustion air ratio in a reversible regenerative heating system of the type comprising a pair of regenerators, a first line 7 for supplying air to the regenerators, a second line 8 for removing flue gas from the regenerators, and valves 9,10 respectively for controlling the flow rate of air in the first line 7 and the flow rate of the flue gas in the second line 8. The apparatus comprises a third line 21 adapted to provide a slave flow of fluid proportional to the flow rate of the flue gas, thermistor type anemometers 17 and 18 for sensing the flow rates of combustion air and fluid and a ratio controller 24 for adjusting the flue gas damper valve 10 in accordance with the flow rates so sensed to maintain the ratio of the flue gas to combustion air at a predetermined ratio.

7 Claims, 2 Drawing Sheets

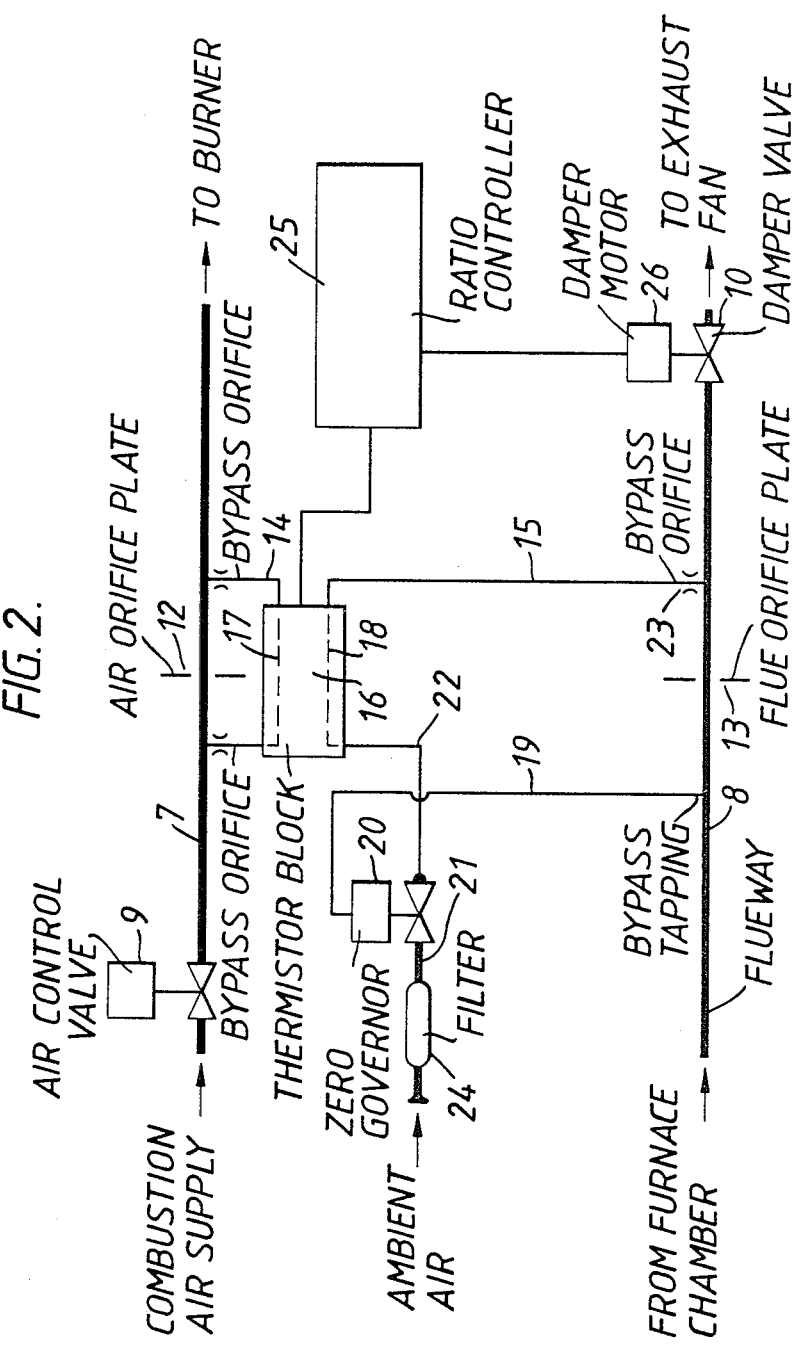

APPARATUS AND METHOD FOR THE FLOW CONTROL OF FLUE GAS TO COMBUSTION AIR IN A REGENERATIVE HEATING SYSTEM

BACKGROUND OF THE INVENTION

The present invention relates to apparatus for the flow control of the flue gas to combustion air ratio in a reversible regenerative heating system of the type having a pair of regenerators, a first line for supplying air to one of the regenerators, a second line for removing flue gas from the regenerators and valves respectively for controlling the flow rate of air in the first line and the flow rate of the flue gas in the second line.

Regenerative systems of the above type are increasingly used to provide heating of a charge held in an enclosure such as a furnace. While one regenerator supplies combusted fuel e.g. natural gas to the furnace the other serves as a flue to remove the spent gas from the furnace as waste gas to atmosphere. After a predetermined period the regenerators reverse roles and that regenerator previously supplying combusted fuel gas now serves as a flue for waste gas while the other regenerator now provides the combusted fuel gas. The waste gas is used to heat up a heat storage bed with which each regenerator is provided. The heat retained in the bed is then subsequently released to preheat combustion air which passes through the bed for preheating to serve as the support for combustion of the fuel gas within the burner of the regenerator.

The regenerators are connected to a reversing valve which is itself connected to a flue gas exhaust duct and a combustion air inlet. The reversing valve is operable to connect one regenerator to the exhaust duct when that regenerator is serving as a flue and the other regenerator to the combustion air inlet when this is supplying combusted fuel. Periodically the reversing valve reverses these connections.

The flow rates of flue gas along the exhaust duct and of the combustion air along the inlet are controlled by valves and it is important that in use the mass flow rates of flue gas and air are balanced to maximise system efficiency.

In order to achieve this balance wherein the ratio of the flow rates of flue gas to combustion air are maintained constant it is conventional to adjust the setting of the flue gas valve in accordance with the varying gas pressure within the furnace chamber. However, if the chamber is "leaky", that is flue gas escapes from the chamber before entering the regenerator which is in its fluing mode, then the flue gas flow rate can vary appreciably without the chamber pressure varying significantly. This will lead to a variation in the flow ratio of the flue gas to combustion air and an out of balance situation.

SUMMARY OF THE INVENTION

It is therefore an object of the present invention to provide apparatus permitting the ratio of the flow rates between the flue gas and combustion air to be maintained at a predetermined ratio irrespective of the furnace chamber pressure.

According to one aspect of the present invention, there is provided apparatus for the flow control of the flue gas to combustion air ratio in a reversible regenerative heating system of the type having a pair of regenerators, a first line for supplying air to the regenerators, a second line for removing flue gas from the regenerators and valves respectively for controlling the flow rate of air in the first line and the flow rate of flue gas in the second line, the apparatus comprising a third line adapted to provide a slave flow of fluid proportional to the flow rate of the flue gas, means for sensing the flow rates of combustion air and fluid and means for adjusting one of the valves in accordance with the flow rates so sensed to maintain the ratio of the flue gas to combustion air at a predetermined ratio.

According to another aspect of the present invention, there is provided a method for the flow control of the flue gas to combustion air ratio in a reversible regenerative heating system of the type having a pair of regenerators, a first line for supplying air to the regenerators, a second line for removing flue gas from the regenerators and valves respectively for controlling the flow rate of air in the first line and the flow rate of flue gas in the second line, the method comprising providing in a third line a slave flow of fluid proportional to the flow rate of the flue gas, sensing the flow rates of combustion air and fluid and adjusting one of the valves in accordance with the flow rates so sensed to maintain the ratio of the flue gas to combustion air at a predetermined ratio.

BRIEF DESCRIPTION OF THE DRAWINGS

An embodiment of the invention will now be particularly described with reference to the drawings in which FIG. 1 is a schematic illustration of a typical reversible regenerative heating system for which the apparatus is suitable and FIG. 2 is a schematic representation of the apparatus for the flow control of the flue gas to combustion air ratio in a reversible regenerative heating system.

DETAILED DESCRIPTION OF THE PREFERRED EMBODIMENTS

Figure 1:
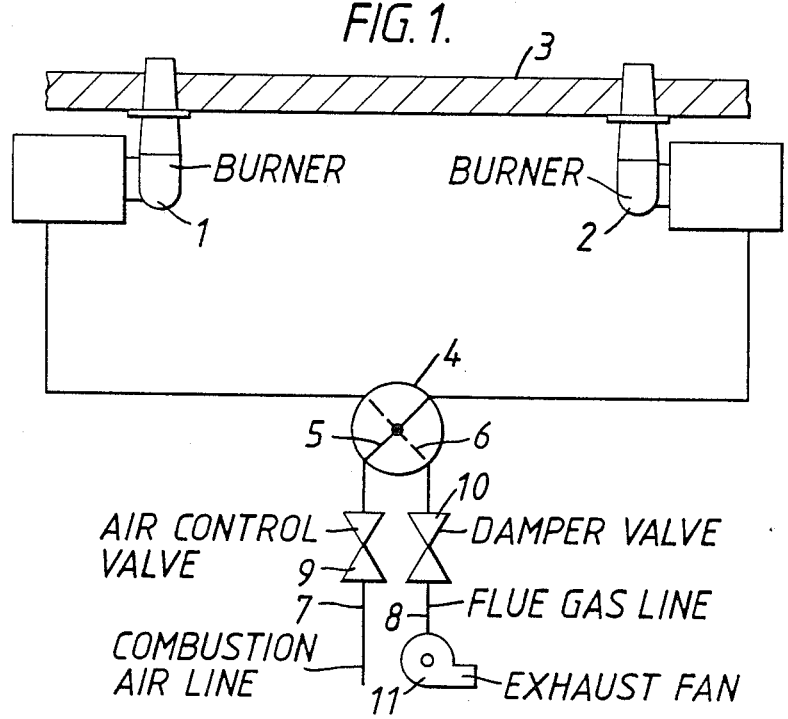

Referring to FIG. 1 the system comprises a pair of burners 1,2 which are arranged to inject combusted fuel into a chamber (not shown), the burners 1,2 being mounted in the wall of 3 of the chamber for this purpose.

Each burner 1,2 is connected to a known type reversible flow valve 4 which has two internal ducts 5,6 which are respectively reversibly connectable to a combustion air line 7 and to a flue gas line 8.

The air line 7 supplies combustion air to one or other of the burners 1,2 (whichever one is operating in the firing mode).

The flue gas line 8 removes waste gas from one or other of the burners 1,2 (whichever one is operating in the fluing mode).

The air line 7 has a valve 9 for controlling the flow rate of combustion air to that burner which is currently firing. The flue gas line 8 has a damper valve 10 for controlling the flow rate of the flue gas from the burner which is currently fluing. The flue gas line 8 is provided with an exhaust fan 11 to assist in the removal of the flue gas.

Referring to FIG. 2 identical components to those shown in FIG. 1 bear similar reference numerals.

The flue gas to combustion airflow ratio is controlled by metering the flow of the combustion air to one burner and the flow of flue gas from the other burner and actuating the damper valve 10 situated in the flue gas line 8 so as to maintain the combustion air to flue gas ratio at a preset level.

The combustion air line 7 and the flue gas line 8 each have orifice plates 12 and 13 shown schematically respectively serving to restrict the flows of air and flue gas along these lines to provide a pressure drop between those portions of the lines on either sides of the plates.

Extending around these plates 12 and 13 are respectively by-passes 14 and 15 passing through a holder 16 incorporating thermistor anemometers 17 and 18 for flow rate measurement purposes.

In flue line 8, a tapping portion 19 upstream of the plate 13 controls a zero-pressure governor 20 situated in an ambient or atmospheric slave flow line 21. The inlet of the governor 20 is connected to the ambient air supply line 21 while its outlet leads to a portion 22 of the by-pass 15 connected to an orifice downstream of the plate 13, within the flue gas line 8. The line 21 incorporates a filter 24 to filter out dust and other particles from the abient air.

The portion 19 of the by-pass 15 upstream of the plate 13 in the flue gas line 8 serves to control the governor 20 such that the pressure in the portion 22 of the by-pass 15 is the same as the pressure in the flue gas line 8 upstream of the plate 13.

The orifice 23 is so positioned as to be at the same temperature as the orifice plate 13 so that the flow through by pass 15 remains in proportion to that in the flueway 8 during normal flueway temperature variation. The orifice 23 is further designed such that the restriction to flow imposed by 22 and 18 is small in comparison.

The anemometers 17 and 18 and the holder 16 form part of a unit which together with a ratio controller 25 is fully described in UK Pat. No. 1571906. The unit is available as the Inter Albion ERC control box and thermistor block.

The anemometers 17 and 18 provide voltage signal outputs proportional to the flow rates of combustion air and ambient air through the by-passes 14 and 15 respectively. These signals are compared in the ratio controller 25 which will generate an error signal if the signal amplitudes deviate from preset levels indicative of the preset flow ratio.

The error signal is output to adjust the setting of the damper valve 10 by the operation of a damper motor 26. This adjustment will alter the flow rate of the flue gas in such a manner as to bring the flow ratio of the combustion air to flue gas back to the preset level.

We claim:

1. Apparatus for the flow control of the flue gas to combustion air ratio in a reversible regenerative heating system of the type comprising a pair of regenerators, a first line for supplying air to the regenerators, a second line for removing flue gas from the regenerators, and valves respectively for controlling the flow rate of air in the first line and the flow rate of flue gas in the second line, the apparatus comprising a third line adapted to provide a slave flow of fluid proportional to the flow rate of the flue gas, means for sensing the flow rates of combustion air and said fluid and means for adjusting one of the valves in accordance with the flow rates so sensed to maintain the ratio of the flue gas to combustion air at a predetermined ratio.

2. Apparatus as claimed in claim 1 in which the third line has upstream of the flow rate sensing means valve means for controlling the flow of fluid along the third line and arranged in such a way that the fluid pressure at the outlet of the valve means in the third line is substantially equal to the flue gas pressure within the second line.

3. Apparatus as claimed in claim 2 in which the second line has a restrictor means for impeding the flow of flue gas along the second line and the valve means in the third line comprises a zero pressure governor which is arranged to maintain its outlet pressure substantially equal to the pressure in the flue gas line at a point upstream of the restrictor means.

4. Apparatus as claimed in claim 3 in which the fluid is air and the outlet from the governor terminates at a point in the second line downstream of the restrictor means but upstream of the flue gas flow rate control valve.

5. A method for the flow control of the flue gas to a combustion air ratio in a reversible regenerative heating system of the type having a pair of regenerators, a first line for supplying air to the regenerators, a second line for removing flue gas from the regenerators and valves respectively for controlling the flow rate of air in the first line and the flow rate of flue gas in the second line, the method comprising providing in a third line a slave flow of fluid proportional to the flow rate of the flue gas, sensing the flow rates of combustion air and said fluid and adjusting one of the valves in accordance with the flow rates so sensed to maintain the ratio of the flue gas to combustion air at a predetermined rate.

6. A method as claimed in claim 5 in which the flue gas flow rate control valve is adjusted to maintain the ratio of the flue gas to combustion air at a predetermined ratio.

7. A method as claimed in claim 5 or claim 6 in which the fluid in the third line is air.

* * * * *